United States Patent
Frances et al.

(10) Patent No.: US 6,911,235 B2
(45) Date of Patent: *Jun. 28, 2005

(54) PLASTIC MATERIAL SURFACE TREATMENT WITH A POLYMERIZABLE AND/OR CROSSLINKABLE ORGANIC COMPOSITION HAVING REACTIVE FUNCTIONS

(75) Inventors: Jean-Marc Frances, Meyzieu (FR); Lucille Gambut, Lyons (FR)

(73) Assignee: Rhodia Chimie, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/203,819
(22) PCT Filed: Feb. 14, 2001
(86) PCT No.: PCT/FR01/00426
§ 371 (c)(1), (2), (4) Date: Dec. 6, 2002
(87) PCT Pub. No.: WO01/62835
PCT Pub. Date: Aug. 30, 2001

(65) Prior Publication Data
US 2003/0211338 A1 Nov. 13, 2003

(30) Foreign Application Priority Data
Feb. 18, 2000 (FR) .......................... 00 02035

(51) Int. Cl.⁷ ................................. B05D 3/06
(52) U.S. Cl. .................. 427/387; 428/447; 428/413
(58) Field of Search .................. 427/387; 428/447, 428/413

(56) References Cited

U.S. PATENT DOCUMENTS 5,340,898 A * 8/1994 Cavezzan et al. ............. 528/19
5,484,950 A   1/1996 Crivello

FOREIGN PATENT DOCUMENTS

| DE | 19900810 A1 | 9/1999 |
| JP | XP 002153264 | 1/1980 |
| JP | 09-208674 | 12/1997 |
| JP | XP 002153263 | 6/1998 |
| JP | 11 349895 | 12/1999 |

* cited by examiner

Primary Examiner—Kuo-Liang Peng
(74) Attorney, Agent, or Firm—Burns, Doane, Swecker & Mathis, L.L.P.

(57) ABSTRACT

The invention concerns a method for treating the surface of a plastic material comprising the following steps: (1) applying on at least one of the surfaces of the plastic material a composition with polymerizable and/or crosslinkable reactive functions comprising: 1 to 99 wt. % of at least a polymerizable and/or at least partially polymerized silicone matrix A, including (co)monomers, (co)oligomers and/or (co)polymers selected among those having oxetane functions (frA); 99 to 1 wt. % of at least a polymerizable and/or at least partially polymerized matrix B, including (co)monomers, (co)oligomers and/or (co)polymers selected among those having epoxy ($\alpha_1$), and/or acrylate ($\alpha_2$) and/or alkenyl-ether ($\alpha_3$) and/or hydroxyl ($\alpha_4$) reactive functions (frB); and efficient amount of at least a cationic or cationic and radical initiator system C; and optionally at least a sensitizer D and at least a pigment E; (2) polymerizing and/or crosslinking the treated surface under an irradiating source and/or under electron beam(s).

21 Claims, No Drawings

PLASTIC MATERIAL SURFACE TREATMENT WITH A POLYMERIZABLE AND/OR CROSSLINKABLE ORGANIC COMPOSITION HAVING REACTIVE FUNCTIONS

The field of the invention is that of the surface treatment of plastics based on silicone compositions which can be crosslinked and/or polymerized under irradiation, in particular under UV irradiation and/or by an electron beam. More specifically, the invention relates to the plastic surface treated for the purpose of forming a silicone coating, such as an ink, a nonstick coating, an adhesive coating or a varnish.

Plastics are increasingly used as packagings, such as containers, in particular cases, bottles and sachets. These plastics can be transparent, translucent, colored or opaque and are generally based on polyethylene, on polypropylene, on polystyrene and/or on polyester.

The development of a surface treatment for coating plastics is complex and requires specific qualities of adhesion, of robustness, of flexibility, of resistance to scratching, of resistance to twisting, of resistance to water and of resistance to stains.

To date, however, technologies, in particular those for thermal drying of systems often based on products carried in solvents, are not suitable for efficiently treating plastic surfaces and for retaining, in particular over time and during the handling thereof, the qualities which are necessary for it.

The present invention proposes to overcome the existing shortcomings in the field of the surface treatment of plastics. One of the essential objectives of the present invention is therefore to provide a novel process for the surface treatment of plastics with a silicone composition which can be crosslinked and/or polymerized by the cationic route or by the cationic and radical route which meets these expectations.

The present invention relates to a novel process for the surface treatment of a plastic for the purpose of forming a coating comprising the following stages:

(1) application, to at least one of the surfaces of the plastic, of a composition with reactive functional groups which can be polymerized and/or crosslinked by the cationic route or by the cationic and radical route comprising:
1 to 99% by weight, and preferably 1 to 60% by weight, of at least one polymerizable and/or at least partially polymerized silicone matrix A comprising (co)monomers, (co)oligomers and/or (co)polymers selected from those having oxetane reactive functional groups (Arf),
99 to 1% by weight, and preferably 99 to 40% by weight, of at least one polymerizable and/or at least partially polymerized matrix B comprising (co)monomers, (co)oligomers and/or (co)polymers selected from those having epoxy ($\alpha_1$) and/or acrylate ($\alpha_2$) and/or alkenyl ether ($\alpha_3$) and/or hydroxyl ($\alpha_4$) reactive functional groups (Brf),
an effective amount of at least one cationic or cationic and radical initiator system C,
optionally at least one sensitizer D,
and optionally at least one pigment E;

(2) and polymerization and/or crosslinking of the treated surface by its exposure under a source of irradiation and/or under electron beam(s).

This novel type of treatment confers on plastics, and more particularly polypropylene, appropriate surface qualities as regards adhesion, robustness, flexibility, resistance to scratching, resistance to twisting, resistance to water, resistance to stains, absence of shrinkage in volume and, in particular for transparent coatings obtained, absence of yellowing.

The exposure under a source of irradiation is generally carried out under UV radiation. More particularly, use is made of UV radiation with a wavelength of the order of 200 to 500 nm.

Preferably, the matrix A with oxetane reactive functional groups (Arf) used within the composition according to the process of the invention is based on highly varied (co)monomers, (co)oligomers and/or (co)polymers of silicone nature. In this respect, the (co)monomers, (co)oligomers and/or (co)polymers of at least one of the following polyorganosiloxane species A1) are particularly suitable, which (co)monomers, (co)oligomers and/or (co)polymers are composed of units of formula (II) and are terminated by units of formula (III) or are cyclic and are composed of units of formula (II), which formulae are represented below:

in which:
the $R^6$ and $R^7$ symbols, which are alike or different, represent:
a linear or branched alkyl radical comprising 1 to 8 carbon atoms which is optionally substituted by at least one halogen, preferably fluorine, the alkyl radicals preferably being methyl, ethyl, propyl, octyl and 3,3,3-trifluoropropyl,
a cycloalkyl radical comprising between 5 and 8 cyclic carbon atoms, which radical is optionally substituted,
an aryl radical comprising between 6 and 12 carbon atoms, which radical can be substituted, preferably phenyl or dichlorophenyl,
an aralkyl radical having an alkyl part comprising between 5 and 14 carbon atoms and an aryl part comprising between 6 and 12 carbon atoms, which part is optionally substituted on the aryl part by halogens, alkyls and/or alkoxyls comprising 1 to 3 carbon atoms,
the Z symbols, which are alike or different, represent:
an $R^6$ and/or $R^7$ group,
a hydrogen radical,
and/or a crosslinkable oxetane functional group connected to the silicon of the polyorganosiloxane via a divalent radical which comprises from 2 to 20 carbon atoms and which can comprise at least one heteroatom, preferably oxygen, it being possible for the latter to be bonded directly to the silicon, forming an ≡Si—OC≡ bond,
with at least one of the Z symbols representing a crosslinkable oxetane functional group.

According to an advantageous alternative form of the invention, the polyorganosiloxanes A1 used comprise from 1 to 10 organofunctional groups per macromolecular chain.

These linear polyorganosiloxanes can be oils with a dynamic viscosity at 25° C. of the order of 10 to 10 000 mPa.s at 25° C., generally of the order of 20 to 5000 mPa.s at 25° C. and more preferably still of 20 to 600 mPa.s at 25° C., or gums exhibiting a molecular mass of the order of 1 000 000.

When the polyorganosiloxanes are cyclic polyorganosiloxanes, the latter are composed of units (II) which can, for example, be of the dialkylsiloxy or alkylarylsiloxy type. These cyclic polyorganosiloxanes exhibit a viscosity of the order of 1 to 5000 mPa.s.

Mention may be made, as examples of an organofunctional radical of the oxetane type connected to the backbone of the polyorganosiloxane A1, of the group of following formula:

The oxetane functional polyorganosiloxanes can be prepared by hydrosilylation of unsaturated oxetanes or condensation of oxetanes including a hydroxyl functional group.

The polyorganosiloxanes A1 corresponding best to the subject matter of the invention are described in the formulae below. X can represent an alkyl, cyclohexyl, trifluoropropyl, perfluoroalkyl, alkoxy or hydroxypropyl group and R can represent a $C_1$ to $C_{10}$ alkyl, cyclohexyl, trifluoropropyl or $C_1$ to $C_{10}$ perfluoroalkyl radical and $(0 \leq a \leq 1\ 000)$; $(1 \leq b \leq 1\ 000)$;

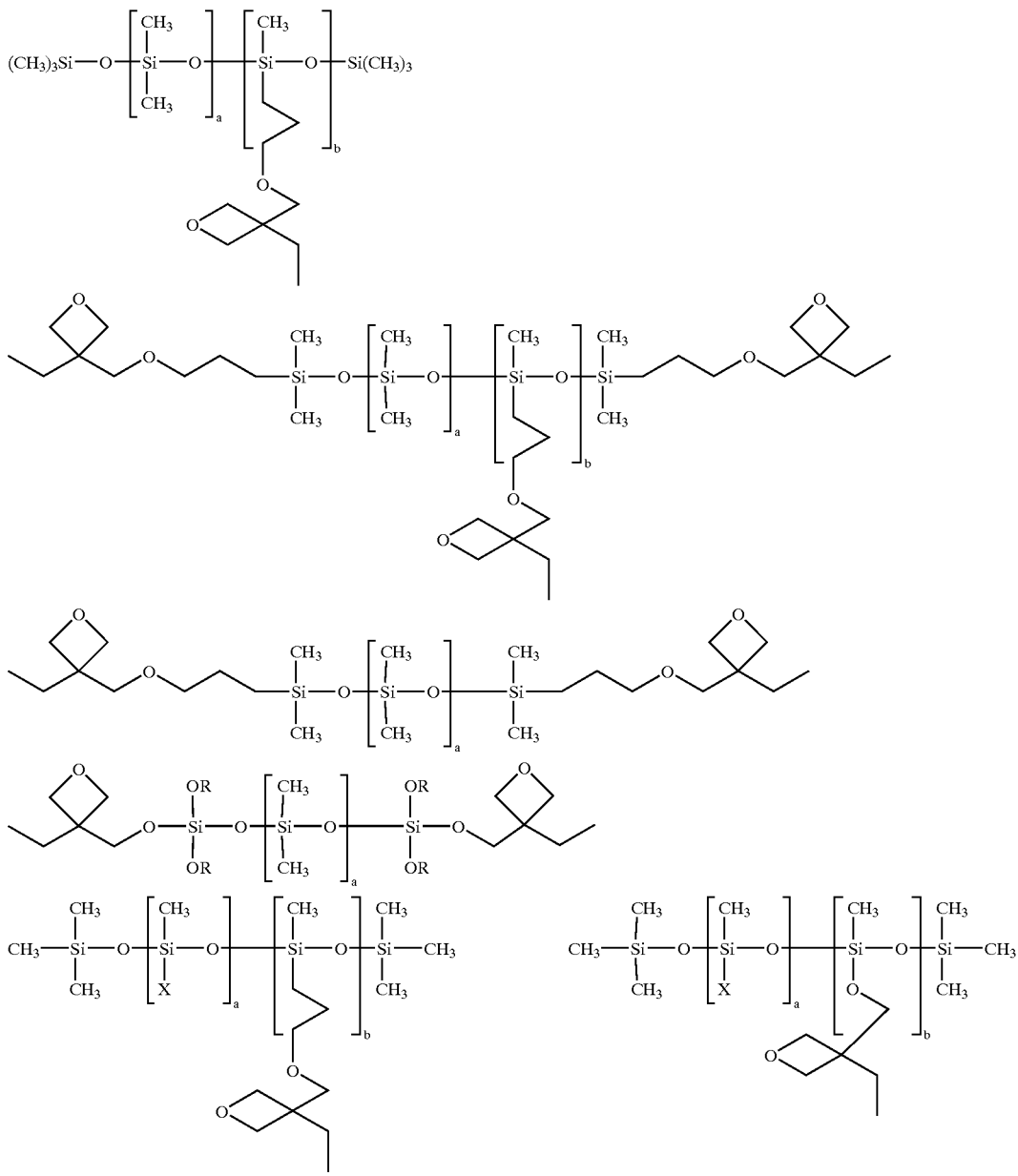

In addition to species of silicone nature, the matrix A can comprise (co)monomers, (co)oligomers and/or (co)polymers of organic natures, which (co)monomers, (co)oligomers and/or (co)polymers are composed of at least one of the species of following formulae:

A2) monomers with oxetane and alkoxy functional groups, oxetane and hydroxyl functional groups, or oxetane and alkoxysilyl functional groups of formula:

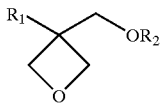

in which:

$R_1$ is (i) a hydrogen atom; (ii) a linear or branched alkyl radical comprising from 1 to 30 carbon atoms; (iii) an aryl radical comprising from 6 to 30 carbon atoms, which radical is optionally substituted by at least one fluorine atom, one carboxyl radical, one hydroxyl radical, one ester radical or one radical with a ketone functional group; (iv) a cycloalkyl radical comprising from 5 to 6 carbon atoms, which radical is optionally substituted by at least one fluorine atom, one hydroxyl radical, one carboxyl radical, one ester radical or one radical with a ketone functional group; (v) an OR' radical where R' is a linear or branched alkyl radical comprising from 1 to 30 carbon atoms; or (vi) an alkenyl radical comprising from 2 to 12 carbon atoms, $R_2$ is (i) a hydrogen atom; (ii) an alkenyl radical comprising from 2 to 12 carbon atoms (for example a vinyl radical or a propenyl radical); (iii) a linear or branched alkyl-radical comprising from 1 to 30 carbon atoms, which radical is optionally substituted, for example by an oxirane group; (iv) an aryl radical comprising from 6 to 30 carbon atoms, which radical is optionally substituted, for example by at least one alkyl radical comprising from 1 to 30 carbon atoms, one benzyl radical, one $CF_3$ radical, one halogen atom, one hydroxyl radical, one carboxyl radical or one alkoxy radical; (v) a linear or branched alkylated and silylated or silylated group —$(C_nH_{2n})$—$SiR_3R_4R_5$, where n is between 1 and 12 and $R_3$, $R_4$ and $R_5$, which are identical or different, represent a hydrogen atom, a hydroxyl radical or an alkoxy radical OR' where R' is a linear or branched alkyl radical comprising from 1 to 30 carbon atoms; (vi) a linear or branched alkyl radical comprising from 1 to 30 carbon atoms; (vii) an aryl radical comprising from 6 to 30 carbon atoms, which radical is optionally substituted; (viii) an alkenyl radical comprising from 2 to 12 carbon atoms; (ix) an acrylate radical; (x) a methacrylate radical (for example —CO—CH=$CH_2$; or (xi) a urethane radical —CO—NH—$R_1$ in which $R_1$ has the same definition as that given above, A3) monomers comprising carboxyl and oxetane functional groups or comprising oxetane and alkoxysilyl functional groups of formula:

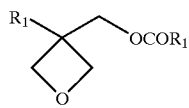

in which:

$R_1$ has a definition identical to that given in A2),
$R_2$ has a definition identical to that given in A2);

A4) difunctional oxetane monomers of formula:

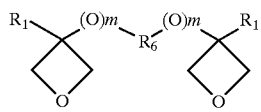

in which:

m, which is identical or different, is equal to 0 or 1,
$R_1$ has a definition identical to that given in A2),
$R_6$, a divalent radical, is (i) a linear or branched alkyl radical comprising from 1 to 30 carbon atoms; (ii) an aryl radical comprising from 6 to 30 carbon atoms, which radical is optionally substituted (by at least one alkyl radical comprising from 1 to 30 carbon atoms; (iii) an aryl radical comprising from 6 to 30 carbon atoms (for example a benzyl radical); (iv) a cycloalkyl radical comprising from 5 to 30 carbon atoms (ex.: cyclohexyl); (v) a —$CH_2$—$C_6H_{10}$—$CH_2$— radical; (vi) a —$CH_2$—$C_6H_4$—$CH_2$— radical; (vii) a $CF_3$ radical; (viii) a halogen atom; (ix) a hydroxyl radical; (x) a carboxyl radical; (xi) an alkoxy radical OR' where R' has a definition identical to that given in A2); (xii) a silyl group =$SiR_3R_4$ where n is between 0 and 12 and $R_3$ and $R_4$, which are identical or different, represent a hydrogen atom, a hydroxyl radical, an alkoxy radical OR' where R' has a definition identical to that given in A2), a linear or branched alkyl radical comprising from 1 to 30 carbon atoms, an aryl radical comprising from 6 to 30 carbon atoms which is optionally substituted, a —$C_6H_4$—$C(CH_3)_2$—$C_6H_4$— radical or an alkenyl radical comprising from 2 to 12 carbon atoms.

Mention will be made, as examples of species A2, of those of following formulae:

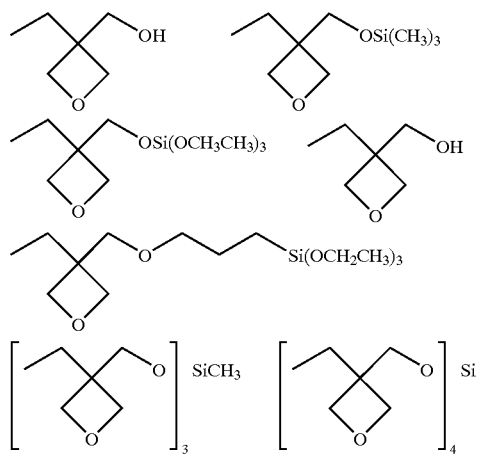

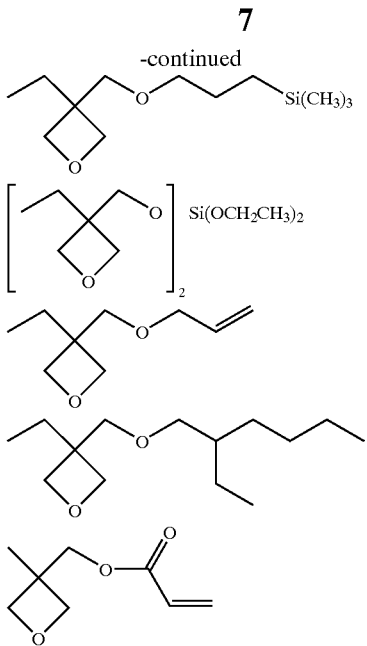

Mention will be made, as examples of species A3, of those of following formulae:

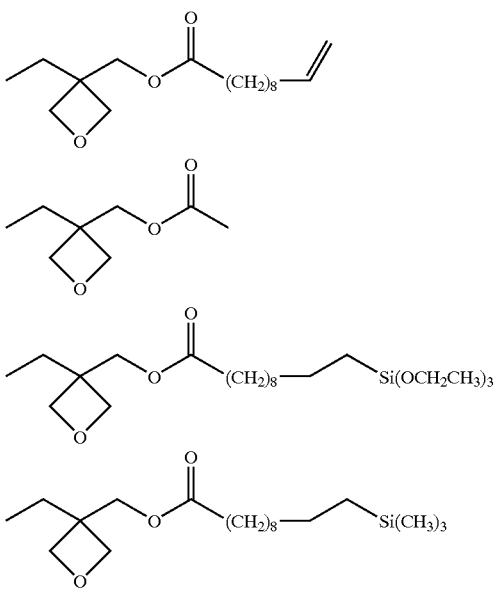

Mention will be made, as species A4, of those of following formulae:

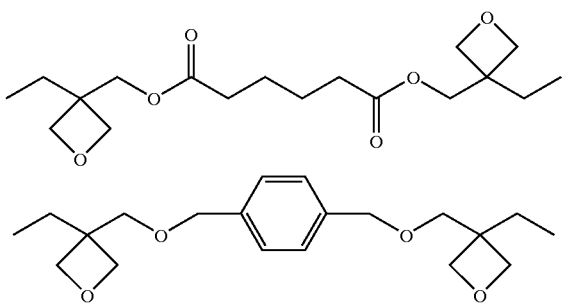

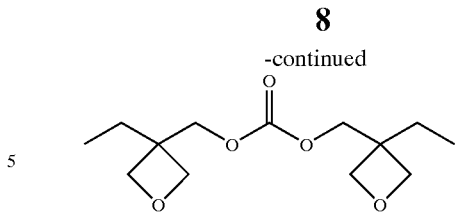

As regards the matrix B, the latter can comprise in particular at least one of the following organic species B1:

$\alpha_{1.1}$) cycloaliphatic epoxides and in particular:
epoxides of the 3,4-epoxycyclohexylmethyl 3',4'-epoxycyclohexanecarboxylate type:

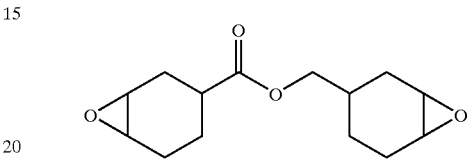

or bis(3,4-epoxycyclohexyl) adipate;

$\alpha_{1.2}$) noncycloaliphatic epoxides and in particular:
epoxides of the type of those resulting from the condensation of bisphenol A and of epichlorohydrin and of the type:
di- and triglycidyl ethers of bisphenol A alkoxylated with 1,6-hexanediol, with glycerol, with neopentyl glycol and with trimethylolpropane,
or diglycidyl ethers of bisphenol A,
α-olefin epoxides, novolac epoxides, epoxidized soybean oil, epoxidized linseed oil and epoxidized polybutadiene, $\alpha_2$) acrylates, and in particular:
epoxidized acrylates, preferably the oligomer of bisphenol A epoxydiacrylate (Ebecryl 600),
polyester glycerol acrylates, preferably a mixture of oligomer of acrylate which is trifunctional obtained from glycerol and polyester (Ebecryl 810),
multifunctional acrylates, preferably pentaerythritol triacrylate (PETA), trimethylolpropane triacrylate (TMPTA), 1,6-hexanediol diacrylate (HDODA), trimethylolpropane ethoxylate triacrylate, thiodiethylene glycol diacrylate, tetraethylene glycol diacrylate (TTEGDA), tripropylene glycol diacrylate (TRPGDA), triethylene glycol diacrylate (TREGDA), trimethylpropane trimethacrylate (TMPTMA), dipentaerythritol pentaacrylate and pentaerythritol ethoxylate tetraacrylate,
urethane acrylates,
polyether acrylates,
polyester acrylates,
unsaturated polyesters,
acrylic acrylates, $\alpha_3$) linear or cyclic alkenyl ethers and in particular:
vinyl ethers, in particular dodecyl vinyl ether (DDVE), cyclohexyl vinyl ether (CVE), butanediol divinyl ether (BDVE), butanediol monovinyl ether (HBVE), cyclohexanedimethanol divinyl ether (CHDVE), cyclohexanedimethanol monovinyl ether (CHMVE), triethylene glycol divinyl ether (DVE-3) and vinyl ethers of formula:

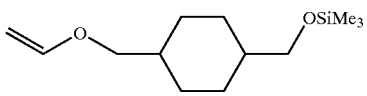

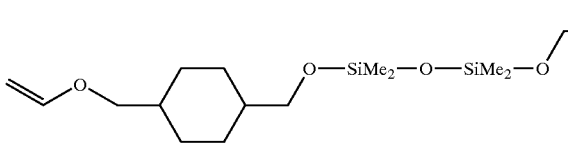

propenyl ethers,
and butenyl ethers;
α$_4$) polyols, and preferably the compound of formula:

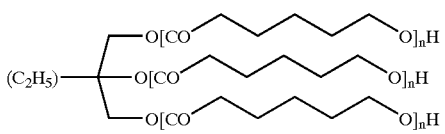

In addition to the organic species B1, the matrix B can also comprise or be based on monomer(s), (co)oligomer(s) and/or (co)polymer(s) of polyorganosiloxanes nature B2, which monomer(s), (co)oligomer(s) and/or (co)polymer(s) are composed of units of formula (IV) and are terminated by units of formula (V) or are cyclic and are composed of units of formula (IV), which formulae are presented below:

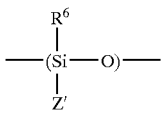
(IV)

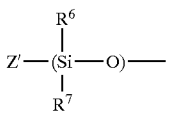
(V)

in which:
the R$^6$ and R$^7$ symbols, which are alike or different, have definitions identical to those given for A1 on pages 4 to 5,
the Z' symbols, which are alike or different, represent:
an R$^6$ and/or R$^7$ group,
a hydrogen radical,
and/or a crosslinkable organofunctional group, preferably an epoxy functional, dioxolane functional and/or alkenyl ether functional group, connected to the silicon of the polyorganosiloxane via a divalent radical which comprises from 2 to 20 carbon atoms and which can comprise at least one heteroatom, preferably oxygen,
with at least one of the Z' symbols representing a crosslinkable organic functional group.

According to an advantageous alternative form of the invention, the polyorganosiloxanes B2 used comprise from 1 to 10 organofunctional groups (Brf) per macromolecular chain. For an epoxy functional group, this corresponds to epoxide levels varying from 20 to 2 000 molar meq/100 g of polyorganosiloxane.

The linear polyorganosiloxanes B2 can be oils with a dynamic viscosity at 25° C. of the order of 10 to 10 000 mPa.s at 25° C., generally of the order of 20 to 5 000 mPa.s at 25° C. and more preferably still of 20 to 600 mPa.s at 25° C., or gums exhibiting a molecular mass of the order of 1 000 000.

In the case of cyclic polyorganosiloxanes B2, the latter are composed of units (IV) which can, for example, be of the dialkylsiloxy or alkylarylsiloxy type. These cyclic polyorganosiloxanes exhibit a viscosity of the order of 1 to 5 000 mPa.s.

Mention may be made, as examples of organofunctional groups (Brf) of the epoxy type connected to the polyorganosiloxane backbone B2, of those of following formulae:

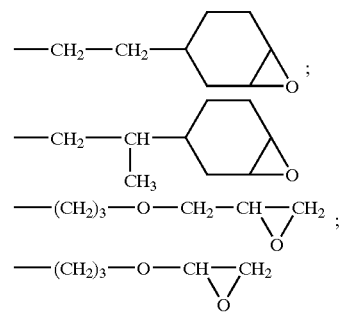

As regards the organofunctional groups (Brf) of the alkenyl ether type connected to the polyorganosiloxane backbone B2, mention may be made of those present in the following formulae:

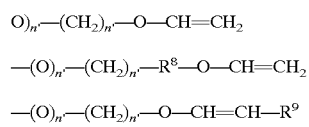

in which:
n' represents 0 or 1 and n" an integer between 1 and 5
R$^8$ represents:
a linear, branched or cyclic C$_1$–C$_{12}$ alkylene radical which is optionally substituted,
or a C$_5$–C$_{12}$ arylene radical, preferably a phenylene radical, which is optionally substituted, preferably by one to three C$_1$–C$_6$ alkyl groups,
R$^9$ represents a linear or branched C$_1$–C$_6$ alkyl radical.

As regards the organofunctional dioxolane groups (Brf) alkenyl ether connected to the polyorganosiloxane backbone B2, mention may be made of those present in the following formulae:

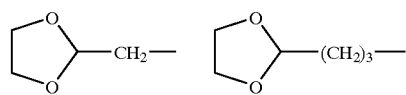

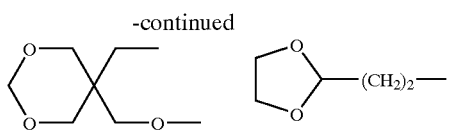

The polyorganosiloxanes B2 with epoxy, dioxolane or alkenyl ether functional groups (Brf) are generally provided in the form of fluids exhibiting a viscosity at 25° C. of 10 to 10 000 mm²/s and preferably of 20 to 600 mm²/s.

The dynamic viscosity at 25° C. of all the silicones considered in the present description can be measured using a Brookfield viscometer, according to Standard AFNOR NFT 76 102 of February 1972.

The alkenyl ether functional polyorganosiloxanes B2 can be prepared by a hydrosilylation reaction between oils comprising Si—H units and vinyloxy functional compounds, such as allyl vinyl ether or allylvinyloxyethoxybenzene.

The epoxy functional polyorganosiloxanes B2 can be prepared by a hydrosilylation reaction between oils comprising Si—H units and epoxy functional compounds, such as 4-vinylcyclohexene oxide, allyl glycidyl ether, and the like.

The dioxolane functional polyorganosiloxanes B2 can be prepared by hydrosilylation of unsaturated dioxolanes.

The polyorganosiloxanes B2 corresponding best to the subject matter of the invention are described in the formulae hereinbelow and have at least one epoxide, alkenyl ether or oxetane group. X can represent an alkyl, cyclohexyl, trifluoropropyl, perfluoroalkyl, alkoxy or hydroxypropyl group, R can represent a $C_1$ to $C_{10}$ alkyl, cyclohexyl, trifluoropropyl or $C_1$ to $C_{10}$ perfluoroalkyl radical and $(0 \leq a \leq 1\ 000)$; $(1 \leq b \leq 1\ 000)$.

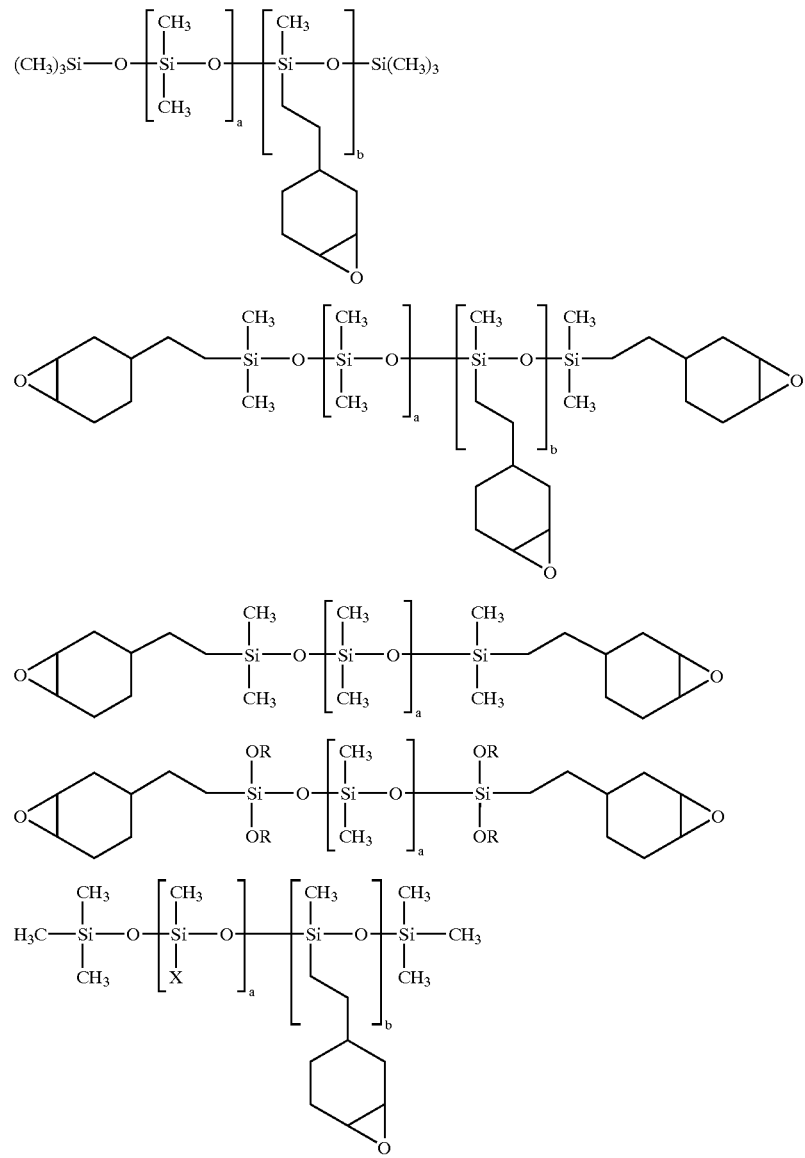

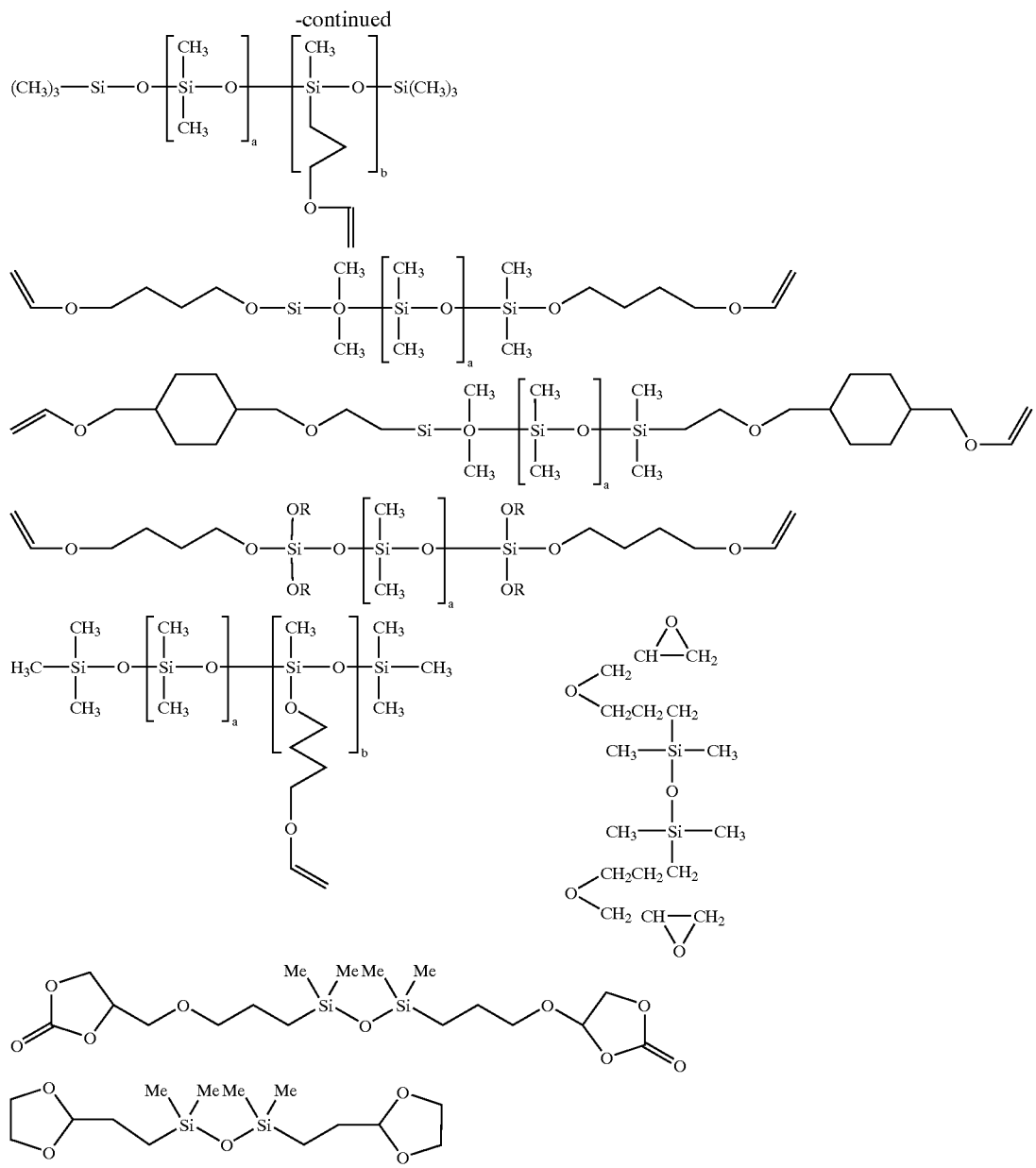

The initiation of the polymerization and/or crosslinking stage according to the invention is carried out by virtue of the presence of the initiator system C, which is either cationic or cationic and radical.

The cationic initiators can be chosen from onium borates (taken on their own or as a mixture of them), the onium being that of an element from Groups 15 to 17 of the Periodic Table [Chem. & Eng. News, Vol. 63, No. 5, 26, of Feb. 4, 1985], or borates of an organometallic complex of an element from Groups 4 to 10 of the Periodic Table [same reference].

The cationic entity of the cationic initiator is selected from:

1) onium salts of formula (VI):

in which:

A represents an element from Groups 15 to 17, such as, for example: I, S, Se, P or N, $R^{10}$ represents a $C_6$–$C_{20}$ carbocyclic or heterocyclic aryl radical, it being possible for said heterocyclic radical to comprise nitrogen or sulfur as heteroelements, $R^{11}$ represents $R^{10}$ or a linear or branched $C_1$–$C_{30}$ alkyl or alkenyl radical; said $R^{10}$ and $R^{11}$ radicals optionally being substituted by a $C_1$–$C_{25}$ alkoxy, $C_1$–$C_{25}$ alkyl, nitro, chloro, bromo, cyano, carboxyl, ester or mercapto group, n is an integer ranging from 1 to v+1, v being the valency of the element A, m is an integer ranging from 0 to v−1, with n+m=v+1, 2) the oxoisothiochromanium salts disclosed in patent application WO 90/11303, in particular the sulfonium salt of 2-ethyl-4-oxoisothiochromanium or of 2-dodecyl-4-oxoisothiochromanium, 3) sulfonium salts in which the cationic entity comprises:

$3_1$ at least one polysulfonium species of formula VIII.1:

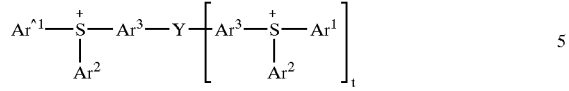
(VIII.1)

in which:
- the $Ar^1$ symbols, which are identical or different, each represent a monovalent aromatic radical (for example: phenyl or naphthyl) optionally substituted with one or more radicals chosen from: (i) a linear or branched $C_1$–$C_{12}$, preferably $C_1$–$C_6$, alkyl radical, (ii) a linear or branched $C_1$–$C_{12}$ alkoxy radical optionally substituted by an —OH group, preferably a $C_1$–$C_6$ alkoxy radical, (iii) a halogen atom, (iv) an —OH group, (v) a —COOH group, (vi) a —COO-alkyl ester group, where the alkyl part is a linear or branched $C_1$–$C_{12}$, preferably $C_1$–$C_6$, residue, and (vii) a group of formula —$Y^4$—$Ar^2$, where the $Y^4$ and $Ar^2$ symbols have the meanings given immediately below,
- the $Ar^2$ symbols, which are identical or different, each represent a monovalent aromatic radical (for example: phenyl or naphthyl) optionally substituted with one or more radicals chosen from: (i) a linear or branched $C_1$–$C_{12}$ alkyl radical optionally substituted by an —OH group, preferably a $C_1$–$C_6$ alkyl radical, (ii) a linear or branched $C_1$–$C_{12}$, preferably $C_1$–$C_6$, alkoxy radical, (iii) a halogen atom, (iv) an —OH group, (v) a —COOH group, (vi) a —COO-alkyl ester group, where the alkyl part is a linear or branched $C_1$–$C_{12}$, preferably $C_1$–$C_6$, residue, the $Ar^3$ symbols, which are identical or different, each represent a divalent phenylene or naphthalene radical optionally substituted with one or more radicals chosen from: (i) a linear or branched $C_1$–$C_{12}$, preferably $C_1$–$C_6$, alkyl radical, (ii) a linear or branched $C_1$–$C_{12}$, preferably $C_1$–$C_6$, alkoxy radical, (iii) a halogen atom, (iv) an —OH group, (v) a —COOH group, (vi) a —COO-alkyl ester group, where the alkyl part is a linear or branched $C_1$–$C_{12}$, preferably $C_1$–$C_6$, residue,
- t is an integer equal to 0 or 1, with the additional conditions according to which:
  - when t=0, the Y symbol is then a $Y^1$ monovalent radical representing the group of formula:

$Y^1$: 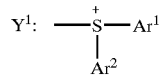

where the $Ar^1$ and $Ar^2$ symbols have the meanings given above,
  - when t=1:
    - on the one hand, the Y symbol is then a divalent radical having the following meanings $Y^2$ to $Y^4$:
      - $Y^2$: a group of formula:

where the $Ar^2$ symbol has the meanings given above,

- $Y^3$: a single valency bond,
  - $Y^4$: a divalent residue chosen from:

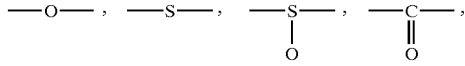

a linear or branched $C_1$–$C_{12}$, preferably $C_1$–$C_6$, alkylene residue and a residue of formula —Si(CH$_3$)$_2$O—,
  - on the other hand, solely in the case where the Y symbol represents $Y^3$ or $Y^4$, the $Ar^1$ and $Ar^2$ (terminal) radicals have, in addition to the meanings given above, the possibility of being connected to one another via the Y' residue consisting of $Y'^1$ a single valency bond, or of $Y'^2$, a divalent residue chosen from the residues cited with respect to the definition of $Y^4$, which is inserted between the carbon atoms, facing each other, situated on each aromatic ring in the ortho position with respect to the carbon atom connected directly to the $S^+$ cation;

$3_2$ at least one monosulfonium species having a single $S^+$ cationic center per mole of cation and comprising, in the majority of cases, species of formulae:

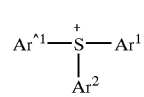
(VIII.2)

in which formula $Ar^1$ and $Ar^2$ have the meanings given above with respect to the formula (VIII.1), including the possibility of directly connecting between them only one of the $Ar^1$ radicals to $Ar^2$ according to the manner indicated above with respect to the definition of the additional condition in force when t=1 in the formula (II) involving the Y' residue;

$3_3$ and/or at least one monosulfonium species having a single $S^+$ cationic center per mole of cation and of formulae:

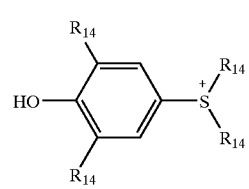
(VIII.3)

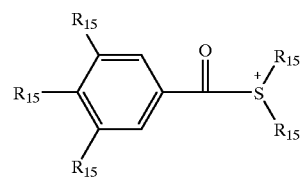
(VIII.4)

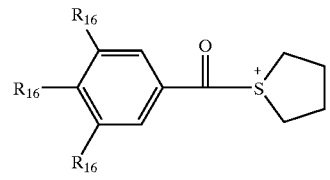
(VIII.5)

in which $R_{14}$, $R_{15}$ and $R_{16}$, which are identical or different, represent (i) a hydrogen atom, (ii) a halogen atom (for example fluorine), (iii) a linear or branched $C_1$–$C_{30}$ alkyl radical which can be substituted by at least one halogen (for example fluorine),
(iv) an —OH radical, (v) an —O—C(=O)—R radical where R is a linear or branched $C_1$–$C_{30}$ alkyl radical which can be substituted by at least one halogen (for example fluorine), (vi) an OR' alkoxy radical where R' is a linear or branched $C_1$–$C_{30}$ alkyl radical which can be substituted by at least one halogen (for example fluorine), 4) the sulfoxonium salts $S^+$=O corresponding to the sulfonium salts 3) described in the preceding paragraph, 5) organometallic salts of formula (IX):

$$(L^1L^2L^3M)^{q+} \qquad (IX)$$

in which formula:

M represents a metal from the Group 4 to 10, in particular iron, manganese, chromium or cobalt, $L^1$ represents 1 ligand bonded to the metal M via π electrons, which ligand is chosen from $\eta^3$-alkyl, $\eta^5$-cyclopendadienyl and $\eta^7$-cycloheptratrienyl ligands and $\eta^6$-aromatic compounds chosen from optionally substituted $\eta^6$-benzene ligands and compounds having from 2 to 4 condensed rings, each ring being capable of contributing to the valency layer of the metal M via 3 to 8 π electrons;

$L^2$ represents a ligand bonded to the metal M via π electrons, which ligand is chosen from $\eta^7$-cycloheptatrienyl ligands and $\eta^6$-aromatic compounds chosen from optionally substituted $\eta^6$-benzene ligands and compounds having from 2 to 4 condensed rings, each ring being capable of contributing to the valency layer of the metal M via 6 or 7 π electrons;

$L^3$ represents from 0 to 3 identical or different ligands bonded to the metal M via σ electrons, which ligand(s) is (are) chosen from CO and $NO_2^+$; the total electronic charge q of the complex to which $L^1$, $L^2$ and $L^3$ and the ionic charge of the metal M contribute being positive and equal to 1 or 2.

The borate anionic entity of the cationic initiator has the formula (X):

$$[BX''_a R^{12}_b]^- \qquad (X)$$

in which:

a and b are integers ranging from 0 to 3 for a and from 1 to 4 for b, with a+b=4, the X" symbols represent:
  a halogen atom (chlorine or fluorine) with a=0 to 3,
  an OH functional group with a=0 to 2, the $R^{12}$ symbols, which are identical or different, represent:
  a phenyl radical substituted by at least one electron-withdrawing group, such as, for example, $OCF_3$, $CF_3$, $NO_2$ or CN, and/or by at least 2 halogen atoms (very particularly fluorine), this being when the cationic entity is an onium of an element from Groups 15 to 17,
  a phenyl radical substituted by at least one electron-withdrawing element or group, in particular a halogen atom (very particularly fluorine), $CF_3$, $OCF_3$, $NO_2$ or CN, this being when the cationic entity is an organometallic complex of an element from Groups 4 to 10,
  an aryl radical comprising at least two aromatic nuclei, such as, for example, biphenyl or naphthyl, which is optionally substituted by at least one electron-withdrawing element or group, in particular a halogen atom (very particularly fluorine), $OCF_3$, $CF_3$, $NO_2$ or CN, whatever the cationic entity.

According to a first preferred form, the cationic initiator is chosen from the onium salts of a cationic entity of formula (VI) and of an anionic entity of formula (X).

According to a second preferred form, the cationic initiator is chosen more specifically from the initiator subclasses described hereinbelow.

Thus, the borate anionic entity is preferably chosen from anions of formula $[BF_a R^{12}_b]^-$ in which the $R^{12}$ symbols, which are identical or different, represent a phenyl radical substituted by at least one electron-withdrawing group chosen from $OCF_3$, $CF_3$, $NO_2$ and CN and/or by at least two fluorine atoms.

More specifically, the anions which are very particularly suitable are the following:

| | |
|---|---|
| 1': $[B(C_6F_5)_4]^-$ | 5': $[B(C_6H_3(CF_3)_2)_4]^-$ |
| 2': $[(C_6F_5)_2BF_2]^-$ | 6': $[B(C_6H_3F_2)_4]^-$ |
| 3': $[B(C_6H_4CF_3)_4]^-$ | 7': $[C_6F_5BF_3]^-$ |
| 4': $[B(C_6F_4OCF_3)_4]^-$ | |

As regards the cationic entity of the initiator which can in particular be associated with a borate anionic entity and in particular with a borate anionic entity of formula $[BF_a R^{12}_b]^-$, five families are distinguished:

| | |
|---|---|
| 1) | onium salts of formula (VI), |
| 2) | oxoisothiochromanium salts of formula (VII), |
| 3) | mono- and/or polysulfonium salts, in particular of formulae (VIII.1) to (VIII.5), |
| 4) | sulfoxonium salts, |
| 5) | and organometallic salts of formula (IX). |

The first family 1) is disclosed in numerous documents, in particular in patents U.S. Pat. Nos. 4,026,705, 4,032,673, 4,069,056, 4,136,102 and 4,173,476. The following cations will very particularly be favored among these:

$[C_8H_{17}$—O-Φ-I-Φ-$CH_3]^+$ $[(Φ-CH_3)_2I]^+$
$[C_{12}H_{25}$-Φ-I-Φ-$C(CH_3)_3]^+$ $[(C_8H_{17}$—O-Φ)$_2I]^+$
$[(C_8H_{17}$—O-Φ-I-Φ)$]^+$ $[(CH_3Φ)_3S]^+$
$[(CH_3Φ)_2$—S-Φ-O—$C_8H_{17}]^+$ $[(CH_3$-Φ-I-Φ-$CH(CH_3)_2]^+$
$[(CH_3Φ$-S-ΦS-(ΦCH$_3$)$_2]^+$ $[(C_{12}H_{25}$-Φ)$_2I]^+$
$[(CH_3$-Φ-I-Φ-$OC_2H_5]^+$ $[C_{12}H_{25}$-Φ-I-Φ-$CH_3]^+$
and $[(CH_3)_3C$-Φ-I-Φ-$C(CH_3)_3]^+$ As regards the second family 2) of cationic entities of formula (VII) and of oxoisothiochromanium type, it preferably comprises cations corresponding to the structure DI which is defined on page 14 of application WO-A-90/11303 and has the formula (VII):

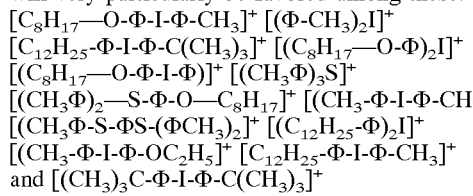

(VII)

where the $R^{13}$ radical has the meaning given in this WO application with respect to the $R^1$ symbol; a cationic entity of this type which is more preferred is that where $R^{13}$ represents a linear or branched $C_1$–$C_{20}$ alkyl radical. Mention will particularly be made, as oxoisothiochromanium salts which are particularly well suited, of the sulfonium salt of 2-ethyl-4-oxoisothiochromanium or of 2-dodecyl-4-oxoisothiochromanium.

As regards the cationic sulfonium entities of the family 3), it will be specified that the cationic entity preferably comprises at least one of the following species:

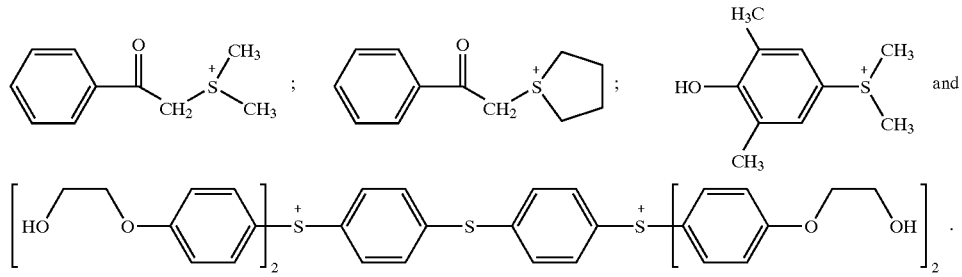

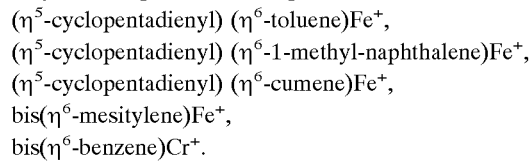

As regards the fifth type of cationic entity (IX), it is found disclosed in patent U.S. Pat. Nos. 4,973,722 and 4,992,572 and European patent applications EP-A-203 829, EP-A-323 584 and EP-A-354 181. The organometallic salts more readily used in practice are in particular:

($\eta^5$-cyclopentadienyl) ($\eta^6$-toluene)Fe$^+$, ($\eta^5$-cyclopentadienyl) ($\eta^6$-1-methyl-naphthalene)Fe$^+$, ($\eta^5$-cyclopentadienyl) ($\eta^6$-cumene)Fe$^+$, bis($\eta^6$-mesitylene)Fe$^+$, bis($\eta^6$-benzene)Cr$^+$.

Mention will be made, as examples of preferred initiators of the onium borates type, of the following products:

$[C_8H_{17}$—O-$\Phi$-I-$\Phi$-CH$_3]^+$ $[B(C_6F_5)_4]^+$ $(C_8H_{17})$—O-$\Phi$-I-$\Phi$ $(C_{12}H_{25})]^+$ $[B(C_6F_5)_4]^-$ $[C_{12}H_{25}$-$\Phi$-I-$\Phi$(CH$_3$)]$^+$ $[B(C_6F_5)_4]^-$ $[(C_8H_{17}$—O-$\Phi$)$_2$I]$^+$ $[B(C_6F_5)_4]^-$ $[(C_8H_{17})$—O-$\Phi$-I-$\Phi$CH(CH$_3$)$_2]^+$ $[B(C_6F_5)_4]$ $[(CH_3\Phi)_3S]^+$ $[B(C_6F_5)_4]^-$ $[(CH_3\Phi)_2S-\Phi-O-C_8H_{17}]^+$ $[B(C_6H_4CF_3)_4]^-$ $[(C_{12}H_{25}-\Phi)_2I]^+$ $[B(C_6F_5)_4]^-$ $[(CH_3\Phi)_3S]^+$ $[B(C_6H_3(m-CF_3)_2)_4]^-$ $[(\Phi-CH_3)_2I]^+$ $[B(C_6F_5)_4]^-$ $[(CH_3\Phi)_3S]^+$ $[B(C_6H_3(m-CF_3)_2)_4]^-$ $[CH_3-\Phi-I-\Phi-CH(CH_3)_2]^+$ $[B(C_6F_5)_4]^-$ $[CH_3-\Phi-I-\Phi-CH(CH_3)_2]^+$ $[B(C_6F_5)_4]^-$

Mention may be made, as other example of an onium salt which can be used within the initiator system C, of those disclosed in U.S. Pat. Nos. 4,138,255 and 4,310,469 (Crivello)

Use may also be made of other cationic initiators; e.g. those sold by Union Carbide (photoinitiator 6990 and 6974 triarylsulfonium hexafluorophosphate and hexafluoroantimonate), iodonium hexafluorophosphate or hexafluoroantimonate salts, or the ferrocenium salts of these various anions.

The radical initiators capable of being used within the initiator systems C are based on benzophenones. Mention may be made, by way of examples, of those sold by Ciba-Geigy: Irgacure 184, Irgacure 500, Darocure 1173, Irgacure 1700, Darocure 4265, Irgacure 907, Irgacure 369, Irgacure 261, Irgacure 784 DO, Irgacure 2959 and Irgacure 651.

The radical initiators can comprise one or more phosphorus atoms, such as those sold by Ciba-Geigy (Irgacure 1700) or BASF (Lucirin TPO).

The initiator system C is advantageously employed in solution in an organic solvent (accelerator), preferably chosen from proton donors and more preferably still from the following groups: isopropyl alcohols, benzyl alcohols, diacetone alcohol, butyl lactate and their mixtures. The photoinitiator C can also be employed directly by dissolving in the matrix A and/or B.

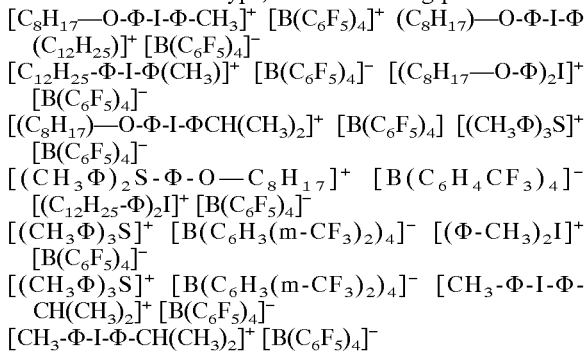

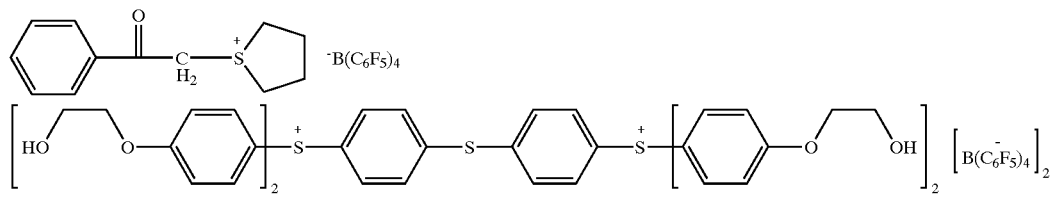

($\eta^5$-cyclopentadienyl) ($\eta^6$-toluene)Fe$^+$[B (C$_6$F$_5$)$_4$]$^-$ ($\eta^5$-cyclopentadienyl) ($\eta^6$-1-methylnaphthalene)-Fe$^+$[B (C$_6$F$_5$)$_4$]$^-$ and ($\eta^5$-cyclopentadienyl) ($\eta^6$-cumene)Fe$^+$[(B(C$_6$F$_5$)$_4$]$^-$.

Mention may be made, as other literature reference in defining the onium borates 1) and the oxoisothiochromanium borates 2) and the borates of organometallic salts 5), which are selected as initiator in the context of the invention, of the entire contents of patent applications EP 562 897 and EP 562 922. These contents are incorporated in full by reference in the present account.

The term "effective amount of initiator system" is understood to mean, within the meaning of the invention, the amount sufficient to initiate the crosslinking. This effective amount advantageously corresponds to $1 \times 10^{-6}$ to 1, preferably from $1 \times 10^{-5}$ to $1 \times 10^{-1}$ and more preferably still from $1 \times 10^{-4}$ to $1 \times 10^{-2}$ mol of initiator system per 1 mol of Arf and Brf.

The treatment composition according to the invention can also comprise at least one (photo)-sensitizer D. This is because, to overcome possible disadvantages related to the structure of the plastics, to the treatment composition according to the invention, to the type of activation used and/or to the intrinsic inhibiting properties of certain packagings (thick coating and/or plastic, coating and/or plastic with pigments and the like), the use of a (photo)-sensitizer D proves to be very beneficial.

By way of examples, the photosensitizer D can be selected from (poly)aromatic products, which are optionally metallic, and heterocyclic products and preferably chosen from the list of following products: phenothiazine, tetracene, perylene, anthracene, 9,10-diphenylanthracene, thioxanthone, 2-chlorothioxanthen-9-one, 1-chloro-4-propoxy-9H-thioxanthen-9-one, isopropyl-OH-thioxanten-9-one, mixture of 2- and 4-isomers, 2-isopropyl-9H-thioxanthen-9-one, benzophenone, [4-(4-methylphenylthio)phenyl]phenyl-methanone, 4-benzyl-4'-methyldiphenyl sulfide, acetophenone, xanthone, fluorenone, anthraquinone, 9,10-dimethylanthracene, 2-ethyl-9,10-dimethyloxy-anthracene, 2,6-dimethylnaphthalene, 2,5-diphenyl-1,3,4-oxadiazole, xanthopinacol, 1,2-benzanthracene, 9-nitroanthracene, and their mixtures.

Mention will be made, among the pigments E capable of being present within the treatment composition, of, for example, the following products: titanium dioxide, kaolin, calcium carbonate, black iron oxide, nitrogenous barium salts, aluminum pigments, calcium borosilicate, carbanzole violet, azo pigments, red iron oxide, yellow iron oxide, diazo, naphthol, carbon black, bayrite, dianisidine, monoarylide, pyrazolone, toluidine, calcium red, nitrogenous Ca salts, nitrogenous Ba salts, diarylide, monoarylide, phthalocyanine, benzimidazoline, bronze powder or rhodamine.

Other additives can also be used. Mention may be made, by way of examples, of dyes, fillers (silicone or nonsilicone), surfactants, inorganic reinforcing fillers (siliceous or nonsiliceous), bactericides, corrosion inhibitors, binding bases, organosilicon compounds or epoxide compounds, such as alkoxysilanes, epoxycycloaliphatic compounds or epoxyetheraliphatic compounds.

In addition to the various components cited previously, the compositions of the treatment process according to the invention can comprise a stabilization additive based on a tertiary, secondary or primary aliphatic amine and preferably chosen from the derivatives disclosed in patent application WO98/07798.

EXAMPLES

The examples which follow will make possible a better understanding of the invention and will make it possible to bring out all its advantages and to glimpse some of its alternative embodiments.

Example 1

Formulation

A formulation according to the invention respectively comprises, by mass:

80 g of silicone oil H1 with a viscosity of 200 mPa.s, with the following formula where a=10:

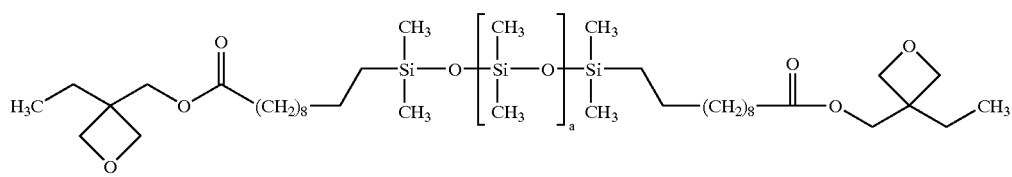

20 g of oxetane O1 of formula:

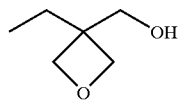

and 2.5 g of an 18% solution of Rhodorsil® Photoinitiator 2074 in isopropanol.

Tests

The formulation is applied in a proportion of 10 g/m² to transparent polypropylene plaques with a thickness of 500 μm positioned horizontally.

Polymerization is carried out by irradiation using a 180 W/cm Hg/Ga lamp from IST at a rate of 50 m/min.

The adhesion of the coating obtained is evaluated by measuring the attachment of the polymerized formulation according to a standardized "right-angle lattice pattern" test according to Standard EN ISO 2409. A value of 0 corresponds to perfect adhesion and a value of 5 corresponds to zero adhesion.

Results

The attachment of the polymerized formulation is of very good quality (value equal to 0 according to Standard EN ISO 2409).

Example 2

Formulation

A photocrosslinkable formulation for a nonstick coating including a phthalocyanine blue, pigment of Sunfast Blue 15:30 type is prepared according to the procedure below.

A concentrated pigment base CPB is obtained by dispersion of 50 parts of phthalocyanine blue and 100 parts of the silicone oil H1 in a reactor with a capacity of 500 ml equipped with a central three-bladed stirrer.

After mixing for 30 minutes, the concentrated pigment base CPB is milled on a three-roll mill so as to obtain a dispersion with a midnight blue color and with a particle size of less than 10 μm.

Subsequently, the following are added and mixed with 10 g of-concentrated pigment base: 70 g of silicone oil H1, 20 g of oxetane O1, 2 g of a 50% solution of initiator Rhodorsil® Photoinitiator 2074 in oxetane O1, and 0.5 g of isopropylthioxanthone.

Tests and Results

The quality of the nonstick coating is evaluated on a UV device from IST equipped with two 200 W/cm Hg lamps doped with Ga on a polypropylene plaque (thickness of 500 micrometers).

The formulation is polymerized over a thickness of two micrometers at a rate of 50 m/min.

The adhesion of the coating to the polypropylene plaque, evaluated by measuring the attachment to the support, is considered to be excellent.

The coating is water-resistant.

The hardness of the coating is evaluated according to the pencil hardness test and is at least equal to HB immediately after irradiation of the formulation.

What is claimed is:
1. A process for the surface treatment of a plastic comprising the following stages:
(1) application, to at least one of the surfaces of the plastic, of a composition with polymerizable and/or crosslinkable reactive functional groups comprising:
1 to 99% by weight, of at least one polymerizable and/or at least partially polymerized silicone matrix A comprising (co)monomers, (co)oligomers and/or (co)polymers of at least one polyorganosiloxane species A1), which (co)monomers, (co)oligomers and/or (co)polymers comprise units of formula (II) and are terminated by units of formula (III) or are cyclic and comprise units of formula (II), which formulae are represented below:

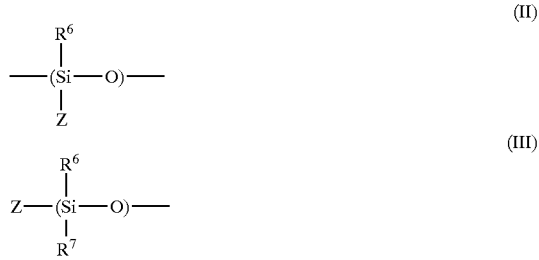

in which:
the $R^6$ and $R^7$ symbols, which are alike or different, represent:
a linear or branched alkyl radical comprising 1 to 8 carbon atoms which is optionally substituted by at least one halogen, the alkyl radicals,
a cycloalkyl radical comprising between 5 and 8 carbon atoms, which radical is optionally substituted, an aryl radical comprising between 6 and 12 carbon atoms, which radical can be substituted,
an aralkyl radical having an alkyl part comprising between 5 and 14 carbon atoms and an aryl part comprising between 6 and 12 carbon atoms, which part is optionally substituted on the aryl part by halogens, alkyls and/or alkoxyls comprising 1 to 3 carbon atoms,
the Z symbols, which are alike or different, represent:
an $R^6$ and/or $R^7$ group,
a hydrogen radical,
and/or a crosslinkable oxetane functional group connected to the silicon of the polyorganosiloxane via a divalent radical which comprises from 2 to 20 carbon atoms and which can comprise at least one heteroatom, it being possible for the latter to be bonded directly to the silicon, forming an ≡Si—OC≡ bond, with at least one of the Z symbols representing a crosslinkable oxetane functional group,
99 to 1% by weight, of at least one polymerizable and/or at least partially polymerized matrix B comprising (co)monomers, (co)oligomers and/or (co) polymers selected from those having epoxy ($\alpha_1$) and/or acrylate ($\alpha_2$) and/or alkenyl ether ($\alpha_3$) and/or hydroxyl ($\alpha_4$) reactive functional groups (Brf),
an effective amount of at least one cationic or cationic and radical initiator system C,
optionally at least one sensitizer D,
and optionally at least one pigment E;
(2) and polymerization and/or crosslinking of the treated surface by its exposure under a source of irradiation and/or under electron beam(s), wherein the matrix B comprises at least one of the following organic species BI: ($\alpha_1$) epoxides or noncycloaliphatic epoxides, ($\alpha_2$) acrylates, ($\alpha_3$) linear or cyclic alkenyl ethers, and ($\alpha_4$) and polyols, wherein the organic species B1 is selected from the group consisting of:
$\alpha_{1.1}$) cycloaliphatic epoxides comprising:
epoxides of the 3,4-epoxycyclohexylmethyl 3',4'-epoxycyclohexanecarboxylate:

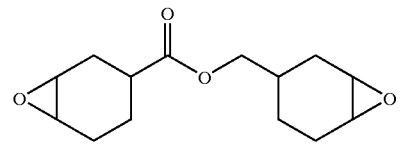

or bis(3,4-epoxycyclohexyl) adipate;
$\alpha_{1.2}$) noncycloaliphatic epoxides comprising:
epoxides resulting from the condensation of bisphenol A and of epichiorohydrin and:
di- and triglycidyl ethers of bisphenol A alkoxylated with 1,6-hexanediol, with glycerol, with neopentyl glycol and with trimethyloipropane,
or diglycidyl ethers of bisphenol A,
α-olefin epoxides, novolac epoxides, epoxidized soybean oil, epoxidized linseed oil and epoxidized polybutadiene,
$\alpha_2$) acrylates, comprising:
epoxidized acrylates,
polyester glycerol acrylates,
multifunctional acrylates comprising pentaerythritol triacrylate (PETA), trimethylolpropane triacrylate (TMPTA), 1,6-hexanediol diacrylate (HDODA), trimethylolpropane ethoxylate triacrylate, thiodiethylene glycol diacrylate, tetraethylene glycol diacrylate (TTEGDA), tripropylene glycol diacrylate (TRPGDA), triethylene glycol diacrylate (TREGDA) or trimethylpropane trimethacrylate (TMPTMA),
urethane acrylates,
polyether acrylates,
polyester acrylates,
unsaturated polyesters,
acrylic acrylates,
$\alpha_3$) linear or cyclic alkenyl ethers comprising:
vinyl ethers comprising dodecyl vinyl ether (DDVE), cyclohexyl vinyl ether (CVE), butanediol divinyl ether (BOVE), butanediol monovinyl ether (HBVE), cyclohexanedimethanol d ivinyl ether (CHDVE), cyclohexanedimethanol monovinyl ether (CHMVE), triethylene glycol divinyl ether (DVE-3) or vinyl ethers of formulae:

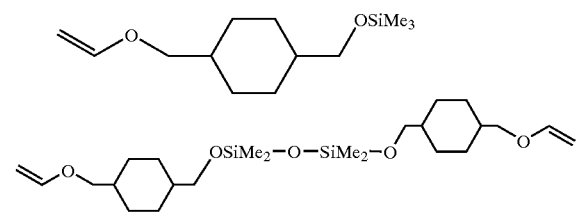

propenyl ethers,
and butenyl ethers;

α4) polyols.

2. The process as claimed in claim 1, wherein the initiator C is a cationic initiator, the anionic entity of which is a borate of formula (X):

$$[BX''_a R^2_b]^-  \quad (X)$$

in which:
- a and b are integers ranging from 0 to 3 for a and from 1 to 4 for b, with
- a+b=4,
- the X" symbols represent:
  - a halogen atom with a=0 to 3, or
  - an OH functional group with a=0 to 2,
- the $R^{12}$ symbols, which are identical or different, represent:
  - a phenyl radical substituted by at least one electron-withdrawing group, and/or by at least 2 halogen atoms, this being when the cationic entity is an onium of an element from Groups 15 to 17 of the Periodic Table,
  - a phenyl radical substituted by at least one electron-withdrawing group, this being when the cationic entity is an organometallic complex of an element from Groups 4 to 10 of the Periodic Table,
  - an aryl radical comprising at least two aromatic nuclei, which is optionally substituted by at least one electron-withdrawing group.

3. The process as claimed in claim 1, wherein the matrix B comprises at least one monomer(s) and/or oligomer(s) and/or polymer(s) of polyorganosiloxane B2, which monomer(s) and/or oligomer(s) and/or polymer(s) comprise units of formula (IV) and are terminated by units of formula (V) or are cyclic and comprise units of formula (IV), which formulae are represented below:

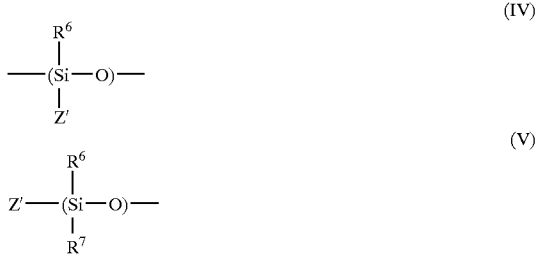

in which:
- $R^6$ and $R^7$ are alike or different, and represent (i) a linear or branched alkyl radical comprising from 1 to 8 carbon atoms, which radical is optionally substituted by at least one halogen; (ii) a cycloalkyl radical comprising between 5 and 8 cyclic carbon atoms, which radical is optionally substituted; (iii) an aryl radical comprising between 6 and 12 carbon atoms, which radical is optionally substituted; (iv) an aralkyl radical having an alkyl part comprising between 5 and 14 carbon atoms and an aryl part comprising between 6 and 12 carbon atoms, which part is optionally substituted on the aryl part by at least one of a halogen, an alkyl, and an alkoxyl comprising 1 to 3 carbon atoms,
- the Z' symbols, which are alike or different, represent:
  - an $R^6$ and/or $R^7$ group,
  - a hydrogen radical,
  - and/or a crosslinkable organofunctional group comprising an epoxy functional, dioxolane functional and/or alkenyl ether functional group, connected at the silicon of the polyorganosiloxane via a divalent radical which comprises from 2 to 20 carbon atoms and which can comprise at least one heteroatom,
  - with at least one of the Z' symbols representing a crosslinkable organic functional group.

4. A treated plastic obtained by the process as claimed in claim 1.

5. The plastic as claimed in claim 4, wherein the surface treatment forms a coating comprising an ink, a nonstick coating, an adhesive coating or a varnish.

6. A coating obtained by the process as claimed in claim 1.

7. The coating as claimed in claim 6, wherein the coating is an ink, a nonstick coating, an adhesive coating or a varnish.

8. A process for the surface treatment of a plastic comprising the following stages:
(1) application, to at least one of the surfaces of the plastic, of a composition with polymerizable and/or crosslinkable reactive functional groups comprising:
1 to 99% by weight, of at least one polymerizable and/or at least partially polymerized silicone matrix A comprising (co)monomers, (co)oligomers and/or (co)polymers of at least one polyorganosiloxane species A1), which (co)monomers, (co)oligomers and/or (co)polymers comprise units of formula (II) and are terminated by units of formula (III) or are cyclic and comprise units of formula (II), which formulae are represented below:

in which:
- the $R^6$ and $R^7$ symbols, which are alike or different, represent:
  - a linear or branched alkyl radical comprising 1 to 8 carbon atoms which is optionally substituted by at least one halogen, the alkyl radicals,
  - a cycloalkyl radical comprising between 5 and 8 carbon atoms, which radical is optionally substituted,
  - an aryl radical comprising between 6 and 12 carbon atoms, which radical can be substituted,
  - an aralkyl radical having an alkyl part comprising between 5 and 14 carbon atoms and an aryl part comprising between 6 and 12 carbon atoms, which part is optionally substituted on the aryl part by halogens, alkyls and/or alkoxyls comprising 1 to 3 carbon atoms,
- the Z symbols, which are alike or different, represent:
  - an $R^6$ and/or $R^7$ group,
  - a hydrogen radical,
  - and/or a crosslinkable oxetane functional group connected to the silicon of the polyorganosiloxane via a divalent radical which comprises from 2 to 20 carbon atoms and which can comprise at least one heteroatom, it being possible for the latter to be bonded directly to the silicon, forming an ≡Si—OC≡ bond, with at least one of the Z symbols representing a crosslinkable oxetane functional group, 99 to 1% by weight, of at least one polymerizable and/or at least partially polymerized matrix B comprising (co)monomers, (co)oligomers and/or (co)polymers selected from those having epoxy ($\alpha_1$) and/or acrylate ($\alpha_2$) and/or alkenyl ether ($\alpha_3$) and/or hydroxyl ($\alpha_4$) reactive functional groups (Brf), an effective amount of at least one cationic or cationic and radical initiator system C, optionally at least one sensitizer D, and optionally at least one pigment E;

(2) and polymerization and/or crosslinking of the treated surface by its exposure under a source of irradiation and/or under electron beam(s), wherein the silicone matrix A additionally comprises at least one of the following (co)monomers and/or (co)oligomers and/or (co)polymers comprising at least one of the following organic species:

A2) monomers with oxetane and alkoxy functional groups oxetane and hydroxyl functional groups, or oxetane and alkoxysilyl functional groups of formula:

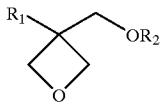

in which:

$R_1$ is (i) a hydrogen atom; (ii) a linear or branched alkyl radical comprising from 1 to 30 carbon atoms; (iii) an aryl radical comprising from 6 to 30 carbon atoms, which radical is optionally substituted by at least one fluorine atom, one carboxyl radical, one hydroxyl radical, one ester radical or one radical with a ketone functional group; (iv) a cycloalkyl radical comprising from 5 to 6 carbon atoms, which radical is optionally substituted by at least one fluorine atom, one hydroxyl radical, one carboxyl radical, one ester radical or one radical with a ketone functional group; (v) an OR' radical where R' is a linear or branched alkyl radical comprising from 1 to 30 carbon atoms; or (vi) an alkenyl radical comprising from 2 to 12 carbon atoms, $R_2$ is (i) a hydrogen atom: (ii) an alkenyl radical comprising from 2 to 12 carbon atoms; (iii) a linear or branched alkyl radical comprising from 1 to 30 carbon atoms, which radical is optionally substituted; (iv) an aryl radical comprising from 6 to 30 carbon atoms, which radical is optionally substituted with at least one alkyl radical comprising from 1 to 30 carbon atoms, one benzyl radical, one $CF_3$ radical, one halogen atom, one hydroxyl radical, one carboxyl radical or one alkoxy radical; (v) a linear or branched alkylated and silylated or silylated group —$(C_nH_{2n})$—$SiR_3R_4R_5$, where n is between 0 and 12 and $R_3$, $R_4$ and $R_5$, which are identical or different, represent a hydrogen atom, a hydroxyl radical or an alkoxy radical OR' where R' is a linear or branched alkyl radical comprising from 1 to 30 carbon atoms; (vi) a linear or branched alkyl radical comprising from 1 to 30 carbon atoms; (vii) an aryl radical comprising from 6 to 30 carbon atoms, which radical is optionally substituted; (viii) an alkenyl radical comprising from 2 to 12 carbon atoms; (ix) an acrylate radical; (x) a methacrylate radical; or (xi) a urethane radical —CO—NH—$R_1$ in which $R_1$ has the same definition as that given above;

A3) monomers comprising carboxyl and oxetane functional groups or comprising oxetane and alkoxysilyl functional groups of formula:

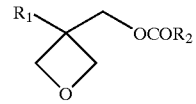

in which:

$R_1$ has a definition identical to that given in A2), $R_2$ has a definition identical to that given in A2);

A4) difunctional oxetane monomers of formula:

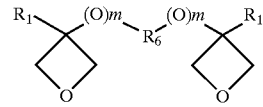

in which:

m, which is identical or different, is equal to 0 or 1, $R_1$ has a definition identical to that given in A2), $R_6$, a divalent radical, is (i) a linear or branched alkyl radical comprising from 1 to 30 carbon atoms; (ii) an aryl radical comprising from 6 to 30 carbon atoms, which radical is optionally substituted (by at least one alkyl radical comprising from 1 to 30 carbon atoms; (iii) an aryl radical comprising from 6 to 30 carbon atoms; (iv) a cycloalkyl radical comprising from 5 to 30 carbon atoms; (v) a —$CH_2$—$C_6H_{10}$—$CH_2$— radical; (vi) a —$CH_2$—$C_6H_4$—$CH_2$— radical; (vii) a silyl group =$SiR_3R_4$ and $R_3$ and $R_4$, which are identical or different, represent a hydrogen atom, a hydroxyl radical, an alkoxy radical OR' where R' has a definition identical to that given in A2), a linear or branched alkyl radical comprising from 1 to 30 carbon atoms, an aryl radical comprising from 6 to 30 carbon atoms which is optionally substituted, an alkenyl radical comprising from 2 to 12 carbon atoms.

9. The process as claimed in claim 8, wherein the initiator C is a cationic initiator, the anionic entity of which is a borate of formula (X):

 (X)

in which:

a and b are integers ranging from 0 to 3 for a and from 1 to 4 for b, with a+b=4, the X" symbols represent:

a halogen atom with a=0 to 3, or an OH functional group with a=0 to 2, the $R^{12}$ symbols, which are identical or different, represent:

a phenyl radical substituted by at least one electron-withdrawing group, and/or by at least 2 halogen atoms, this being when the cationic entity is an onium of an element from Groups 15 to 17 of the Periodic Table, a phenyl radical substituted by at least one electron-withdrawing group, this being when the cationic entity is an organometallic complex of an element from Groups 4 to 10 of the Periodic Table,
an aryl radical comprising at least two aromatic nuclei, which is optionally substituted by at least one electron-withdrawing group.

10. The process as claimed in claim 8, wherein the matrix B comprises at least one monomer(s) and/or oligomer(s) and/or polymer(s) of polyorganosiloxane B2, which monomer(s) and/or oligomer(s) and/or polymer(s) comprise units of formula (IV) and are terminated by units of formula (V) or are cyclic and comprise units of formula (IV), which formulae are represented below:

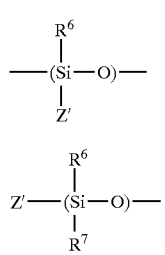

in which:
R$^6$ and R$^7$ are alike or different, and represent (i) a linear or branched alkyl radical comprising from 1 to 8 carbon atoms, which radical is optionally substituted by at least one halogen; (ii) a cycloalkyl radical comprising between 5 and 8 cyclic carbon atoms, which radical is optionally substituted; (iii) an aryl radical comnrising between 6 and 12 carbon atoms, which radical is optionally substituted; (iv) an aralkyl radical having an alkyl part comprising between 5 and 14 carbon atoms and an aryl part comprising between 6 and 12 carbon atoms, which part is optionally substituted on the aryl part by at lest one of a halogen, an alkyl, and an alkoxy comprising 1 to 3 carbon atoms,
the Z' symbols, which are alike or different, represent:
an R$^6$ and/or R$^7$ group,
a hydrogen radical,
and/or a crosslinkable organofunctional group comprising an epoxy functional, dioxolane functional and/or alkenyl ether functional group, connected at the silicon of the polyorganosiloxane via a divalent radical which comprises from 2 to 20 carbon atoms and which can comprise at least one heteroatom,
with at least one of the Z' symbols representing a crosslinkable organic functional group.

11. A treated plastic obtained by the process as claimed in claim 8.

12. The plastic as claimed in claim 11, wherein the surface treatment forms a coating comprising an ink, a nonstick coating, an adhesive coating or a varnish.

13. A coating obtained by the process as claimed in claim 8.

14. The coating as claimed in claim 13, wherein the coating is an ink, a nonstick coating, an adhesive coating or a varnish.

15. A process for the surface treatment of a plastic comprising the following stages:
(1) application, to at least one of the surfaces of the plastic, of a composition with polymerizable andlor crosslinkable reactive functional groups comprising:
1 to 99% by weight, of at least one polymerizable and/or at least partially polymerized silicone matrix A comprising (co)monomers, (co)oligomers and/or (co)polymers of at least one polyorganosiloxane species A1), which (co)monomers, (co)oligomers and/or (co)polymers comprise units of formula (II) and are terminated by units of formula (III) or are cyclic and comprise units of formula (II), which formulae are represented below:

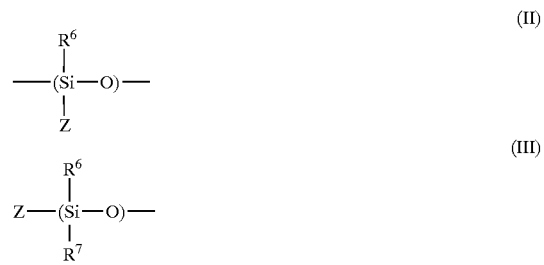

in which:
the R$^6$ and R$^7$ symbols, which are alike or different, represent:
a linear or branched alkyl radical comprising 1 to 8 carbon atoms which is optionally substituted by at least one halogen, the alkyl radicals,
a cycloalkyl radical comprising between 5 and 8 carbon atoms, which radical is optionally substituted, an aryl radical comprising between 6 and 12 carbon atoms, which radical can be substituted,
an aralkyl radical having an alkyl part comprising between 5 and 14 carbon atoms and an aryl part comprising between 6 and 12 carbon atoms, which part is optionally substituted on the aryl part by halogens, alkyls and/or alkoxyls comprising 1 to 3 carbon atoms,
the Z symbols, which are alike or different, represent
an R$^6$ and/or R$^7$ group,
a hydrogen radical,
and/or a crosslinkable oxetane functional group connected to the silicon of the polyorganosiloxane via a divalent radical which comprises from 2 to 20 carbon atoms and which can comprise at least one heteroatom, it being possible for the latter to be bonded directly to the silicon, forming an ≡Si—OC≡ bond, with at least one of the Z symbols representing a crosslinkable oxetane functional group,
99 to 1% by weight, of at least one polymerizable and/or at least partially polymerized matrix B comprising (co)monomers, (co)oligomers and/or (co)polymers selected from those having epoxy ($\alpha_1$) and/or acrylate ($\alpha_2$) and/or alkenyl ether ($\alpha_3$) and/or hydroxyl ($\alpha_4$) reactive functional groups (Brf),
an effective amount of at least one cationic or cationic and radical initiator system C,
optionally at least one sensitizer D,
and optionally at least one pigment E;
(2) and polymerization and/or crosslinking of the treated surface by its exposure under a source of irradiation and/or under electron beam(s), wherein the matrix B comprises at least one monomer(s) and/or oligomer(s) and/or polymer(s) of polyorganosiloxane B2, which monomer(s) and/or oligomer(s) and/or polymer(s) comprise units of formula (IV) and are terminated by units of formula (V) or are cyclic and comprise units of formula (IV), which formulae are represented below:

$$\begin{array}{c} R^6 \\ | \\ -(Si-O)- \\ | \\ Z' \end{array} \quad (IV)$$

$$\begin{array}{c} R^6 \\ | \\ Z'-(Si-O)- \\ | \\ R^7 \end{array} \quad (V)$$

in which:
$R^6$ and $R^7$ are alike or different, and represent (i) a linear or branched alkyl radical comprising from 1 to 8 carbon atoms, which radical is optionally substituted by at least one halogen; (ii) a cycloalkyl radical comprising between 5 and 8 cyclic carbon atoms, which radical is optionally substituted; (iii) an aryl radical comprising between 6 and 12 carbon atoms, which radical is optionally substituted; (iv) an aralkyl radical having an alkyl part comprising between 5 and 14 carbon atoms and an aryl part comprising between 6 and 12 carbon atoms, which part is optionally substituted on the aryl part by at least one of a hydrogen, an alkyl, and an alkoxyl comprising 1 to 3 carbon atoms, the Z' symbols, which are alike or different, represent:
an $R^6$ and/or $R^7$ group,
a hydrogen radical,
and/or a crosslinkable organofunctional group comprising an epoxy functional, dioxolane functional and/or alkenyl ether functional group, connected at the silicon of the polyorganosiloxane via a divalent radical which comprises from 2 to 20 carbon atoms and which can comprise at least one heteroatom, with at least one of the Z' symbols representing a crosslinkable organic functional group, wherein (Brf)s of polyorganosiloxane B2 are selected from the group consisting of the radicals:

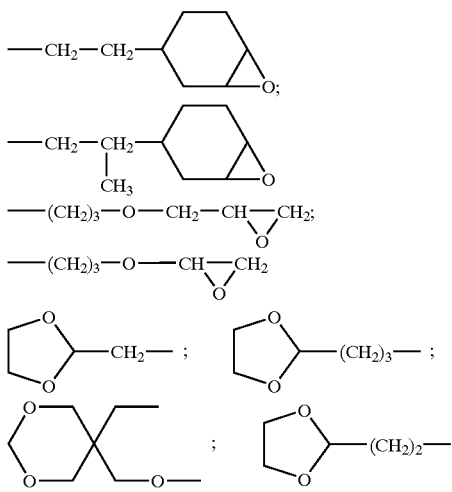

$-(O)_{n'}-(CH_2)_{n''}-O-CH=CH_2$, $-(O)_{n'}-(CH_2)_{n''}-R^8-O-CH=CH_2$ and $-(O)_{n'}-(CH_2)_{n''}-O-CH=CH-R^9$ in which:
n' represents 0 or 1 and n" an integer between 1 and 5
$R^8$ represents:
a linear, branched or cyclic $C_1-C_{12}$ alkylene radical which is optionally substituted,
or a $C_5-C_{12}$ arylene radical which is optionally substituted
and $R^9$ represents a linear or branched $C_1-C_6$ alkyl radical.

16. The process as claimed in claim 15, wherein the initiator C is a cationic initiator, the anionic entity of which is a borate of formula (X):

$$[BX''_a R^{12}_b]^- \quad (X)$$

in which:
a and b are integers ranging from 0 to 3 for a and from 1 to 4 for b, with
a+b=4,
the X" symbols represent:
a halogen atom with a=0 to 3, or
an OH functional group with a=0 to 2,
the $R^{12}$ symbols, which are identical or different, represent:
a phenyl radical substituted by at least one electron-withdrawing group, and/or by at least 2 halogen atoms, this being when the cationic entity is an onium of an element from Groups 15 to 17 of the Periodic Table,
a phenyl radical substituted by at least one electron-withdrawing group, this being when the cationic entity is an organometallic complex of an element from Groups 4 to 10 of the Periodic Table,
an aryl radical comprising at least two aromatic nuclei, which is optionally substituted by at least one electron-withdrawing group.

17. A treated plastic obtained by the process as claimed in claim 15.

18. The plastic as claimed in claim 17, wherein the surface treatment forms a coating comprising an ink, a nonstick coating, an adhesive coating or a varnish.

19. A coating obtained by the process as claimed in claim 15.

20. The coating as claimed in claim 19, wherein the coating is an ink, a nonstick coating, an adhesive coating or a varnish.

21. A process for the surface treatment of a plastic comprising the following stages:
(1) application, to at least one of the surfaces of the plastic, of a composition with polymerizable and/or crosslinkable reactive functional groups comprising:
1 to 99% by weight, of at least one polymerizable and/or at least partially polymerized silicone matrix A comprising (co)monomers, (co)oligomers and/or (co)polymers of at least one polyorganosiloxane species A1), which (co)monomers, (co)oligomers and/or (co)polymers comprise units of formula (II) and are terminated by units of formula (III) or are cyclic and comprise units of formula (II), which formulae are represented below:

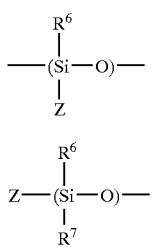
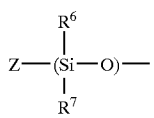

in which:
the $R^6$ and $R^7$ symbols, which are alike or different, represent:
  a linear or branched alkyl radical comprising 1 to 8 carbon atoms which is optionally substituted by at least one halogen, the alkyl radicals,
  a cycloalkyl radical comprising between 5 and 8 carbon atoms, which radical is optionally substituted,
  an aryl radical comprising between 6 and 12 carbon atoms, which radical can be substituted,
  an aralkyl radical having an alkyl part comprising between 5 and 14 carbon atoms and an aryl part comprising between 6 and 12 carbon atoms, which part is optionally substituted on the aryl part by halogens, alkyls and/or alkoxyls comprising 1 to 3 carbon atoms,
the Z symbols, which are alike or different, represent:
  an $R^6$ and/or $R^7$ group,
  a hydrogen radical,
  and/or a crosslinkable oxetane functional group connected to the silicon of the polyorganosiloxane via a divalent radical which comprises from 2 to 20 carbon atoms and which can comprise at least one heteroatom, it being possible for the latter to be bonded directly to the silicon, forming an ≡Si—OC≡ bond, with at least one of the Z symbols representing a crosslinkable oxetane functional group,
99 to 1% by weight, of at least one polymerizable and/or at least partially polymerized matrix B comprising (co)monomers, (co)oligomers and/or (co)polymers selected from those having epoxy ($\alpha_1$) and/or acrylate ($\alpha_2$) and/or alkenyl ether ($\alpha_3$) and/or hydroxyl ($\alpha_4$) reactive functional groups (Brf),
an effective amount of at least one cationic or cationic and radical initiator system C,
optionally at least one sensitizer D,
and optionally at least one pigment E;
(2) and polymerization and/or crosslinking of the treated surface by its exposure under a source of irradiation and/or under electron beam(s), wherein the matrix B comprises at least one monomer(s) and/or oligomer(s) and/or polymer(s) of polyorganosiloxane B2, which monomer(s) and/or oligomer(s) and/or polymer(s) comprise units of formula (IV) and are terminated by units of formula (V) or are cyclic and comprise units of formula (IV), which formulae are represented below:

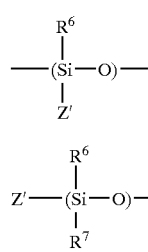
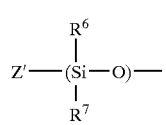

in which:
$R^6$ and $R^7$ are alike or different, and represent (i) a linear or branched alkyl radical comprising from 1 to 8 carbon atoms, which radical is optionally substituted by at least one halogen; (ii) a cycloalkyl radical comprising between 5 and 8 cyclic carbon atoms, which radical is optionally substituted; (iii) an aryl radical comprising between 6 and 12 carbon atoms, which radical is optionally substituted; (iv) an aralkyl radical having an alkyl part comprising between 5 and 14 carbon atoms and an aryl part comprising between 6 and 12 carbon atoms, which part is optionally substituted on the aryl part by at least one of a hydrogen, an alkyl, and an alkoxyl comprising 1 to 3 carbon atoms,
the Z' symbols, which are alike or different, represent:
  an $R^6$ and/or $R^7$ group,
  a hydrogen radical,
  and/or a crosslinkable organofunctional group comprising an epoxy functional, dioxolane functional and/or alkenyl ether functional group, connected at the silicon of the polyorganosiloxane via a divalent radical which comprises from 2 to 20 carbon atoms and which can comprise at least one heteroatom,
  with at least one of the Z' symbols representing a crosslinkable organic functional group.

* * * * *